United States Patent [19]

Sucro et al.

[11] Patent Number: 4,520,689
[45] Date of Patent: Jun. 4, 1985

[54] WINDSHIELD WIPER TRANSMISSION

[75] Inventors: Jost S. Sucro, Huber Heights; Ted A. Moyer, Brookville; William S. Shufflebarger, Dayton, all of Ohio

[73] Assignee: General Motors Corporation, Detroit, Mich.

[21] Appl. No.: 434,114

[22] Filed: Oct. 13, 1982

[51] Int. Cl.³ .............................................. F16C 3/04
[52] U.S. Cl. ...................................... 74/595; 308/3.8
[58] Field of Search ......................... 74/595; 308/3.8; 384/99

[56] References Cited

U.S. PATENT DOCUMENTS 3,164,418  1/1965  Biesecker ............................ 308/3.8
3,299,737  1/1967  Hurlin ................................... 74/595

Primary Examiner—James A. Leppink
Assistant Examiner—Frank McKenzie
Attorney, Agent, or Firm—Dean L. Ellis

[57] ABSTRACT

Automobile windshield wiper apparatus wherein transmission linkage ball stud coupling combinations employ flat surfaces on facing linkage members in the area of each coupling cooperating with a polymeric one-piece socket bushing having a sealing skirt portion providing a lubricant seal.

2 Claims, 5 Drawing Figures

WINDSHIELD WIPER TRANSMISSION

This invention relates to motion transmission apparatus and more particularly to windshield wiper mechanisms for automotive vehicles and the like and transmission linkage therefor.

Vehicle windshield wiper mechanisms typically employ transmission linkage which connect a rotary output crank of an electric motor and gear reduction unit, provided at some optimum location in the car, with a widely spaced pair of wiper arm drive shafts and impart a converted oscillatory coordinated motion to the wiper arms carried by the latter. It is preferred that such linkages be equipped at all points with ball stud type connectors or couplings not only to connect those parts which are on non-parallel rotational axes, but even those which may be on parallel axes for the added purpose that minor misalignments may be accommodated and not lead to objectionable noise, wear or erratic operation in the mechanism. Thus, these ball studs permit limited amounts of relative rotation between the transmission links or crank members in diverse planes. However, the use of ball studs rather than simpler pin joint or like connectors presents considerable added expense, particularly where the parts are properly designed to endure hostile weather and other operating conditions over prolonged vehicle service life. Costly materials and expensive protective plating for ball stud and socket parts have traditionally been used, particularly by the assignee herein. Recently, others have adopted lower cost unplated materials for the ball stud together with a socket or bushing part therefor made of polymeric material, and in an attempt to protect the parts some awkward form of seal is used, intended to prevent the loss of lubricant or the entry of foreign corrosive elements into the ball socket. However, these proposals are demonstrably inadequate or will prove so under extended service conditions.

By the present invention we provide a windshield wiper transmission apparatus which utilizes such lower cost materials and will effectively seal them over extended service life from exposure to the deleterious environments in which they work. In carrying out this objective, we provide a combination useful in a variety of coupling forms and a variety of locations within the wiper mechanism, and particularly addressed to being effective, durable, and cost efficient for those troublesome applications where the parts undergo significant relative rotation in plural diverse planes, i.e., substantial degree of the universal type movement mentioned hereinabove. The apparatus features an improved ball stud socket bushing fabricated of polymeric material snapped into an aperture of one transmission member and receiving within its coupling or inner socket portion the head of a transmission coupling ball stud which is mounted upon a flat surface of the other mated transmission member, universal movement being available within this coupling to an extent suitable to the transmission apparatus in question and the bushing including a depending sealing skirt portion surrounding the shank of the ball stud and adapted to engage sealedly at a terminal end annular lip thereof against the flat surface of the other transmission member in a manner effectively to hold within the confines of the bushing a quantity of protective lubricant or prevent thereinto the entry of foreign matter from the ambient, even under substantial movement of the parts in universal fashion causing substantial deflection of the sealing skirt. The polymeric material of the bushing is selected to enable cost-efficient forming, as by molding, of the bushing in one piece and such that the integral coupling socket and skirt portions thereof may at once serve the conflicting needs for shape retention and toughness within the coupling portion of the bushing under the loads imposed thereon during windshield wiper operation, yet allow the sealing skirt portion to exhibit substantial resiliency, be elastically prestressed when installed between transmission parts into a form to maintain itself in sealing contact with the sealed surface during the universal motion that can occur during wiper mechanism operation, and endure such conditions throughout the expected life of the mechanism.

These and other objects, features, and advantages will be readily apparent from the following specification and from the drawings wherein:

FIG. 1 a fragmentary partially broken away perspective view of an automotive vehicle windshield wiper mechanism including transmission linkage according to this invention;

Figure 1:
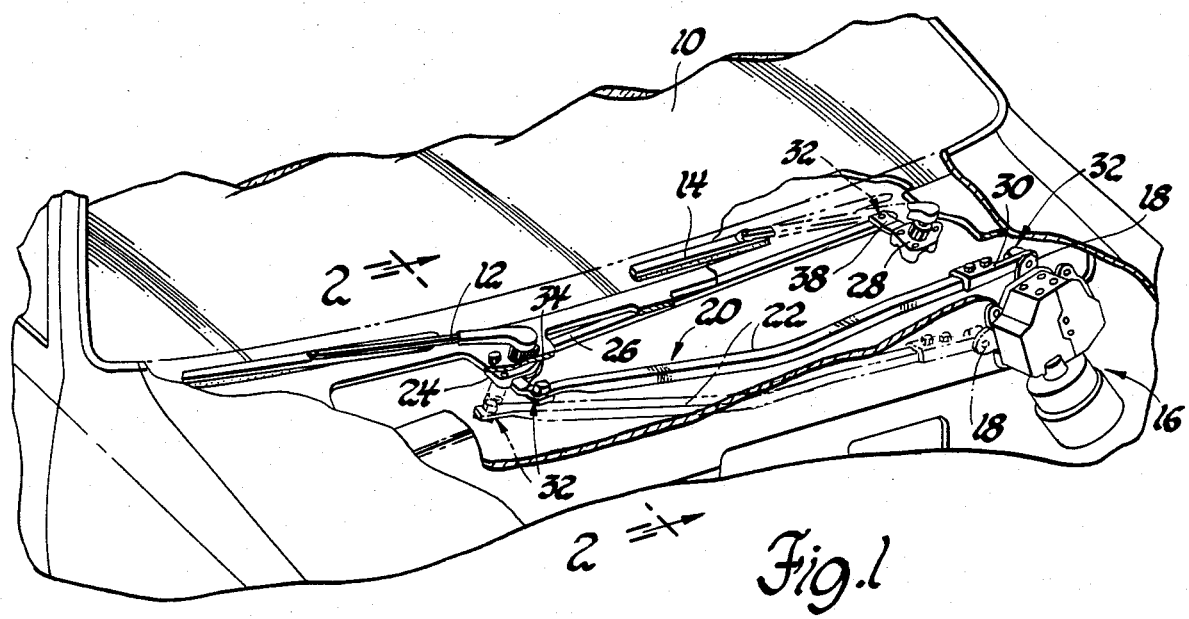

Referring now particularly to FIG. 1 of the drawing, the same illustrates an automobile body including a windshield 10 and windshield wiper apparatus therefor including a widely spaced pair of wiper blades 12 and 14 adapted to oscillate in well-known manner over the windshield between a parked position, as shown, and some selected pattern limit position displaced clockwise from the parked position. The continuous cyclic or oscillatory coordinated motion of the wiper blades is conventionally accomplished by suitable transmission linkage driven by an electric motor drive unit, indicated generally at 16, which typically includes a d.c. motor and speed reduction gear designed to provide low speed high torque continuous uni-directional rotation of an output crank arm member, shown at 18. It is of course usually desired that drive unit 16 be mounted to provide complete freedom of design both as to it and as to the transmission linkage, but crowding of the engine compartment places limits on that freedom and accordingly the unit 16 may have to be mounted in positions such as shown in FIG. 1, and certain parts of the linkage must accommodate substantial displacement in diverse planes, such as indicated by broken lines therein.

The wiper transmission is designated generally as 20 and may include in the particular style of wiper mechanism shown herein a first link assembly 22 oriented generally transversely of the vehicle below windshield 10, a wiper shaft and housing assembly 24 for wiper blade 12, a second transversely oriented operating link 26, and finally a second shaft and housing assembly 28 for wiper blade 14.

Link 22 includes an adjuster member 30 adjustably affixed to the end of a main link element and having in turn at its end, in accordance with this invention, a ball stud coupling 32 operatively connecting crank 18 with the link 22, and another such coupling connecting the latter to assembly 24. Continuous rotation of the crank in one direction will impart to the link cyclic or back and forth motion transverse to the vehicle body as well as swinging motion in generally vertical transverse planes thereof about its coupling to assembly 24.

Figure 2:
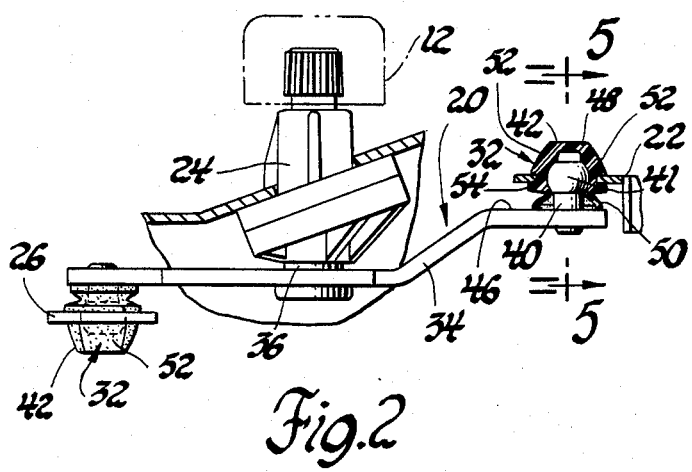
FIG. 2 is an enlarged sectional view taken generally along the plane indicated by lines 2—2 in FIG. 1.

As seen best in FIG. 2, wiper shaft and housing assembly 24 conventionally includes a connecting arm 34 having affixed intermediate its ends thereto for rotation therewith the lower end of a drive shaft 36 journalled within the housing 24. Oscillation imparted to the connecting arm by link 22 will provide the required oscillatory wiping pattern of wiper blade 12 over the windshield as well as transfer a coordinated similar such oscillation to wiper blade 14 via the second transmission link 26. Thus, shaft and housing assembly 28 includes in a form similar to assembly 24 just described another arm 38 affixed to a drive shaft in the housing assembly carrying such arm 14. The two wiper shafts may be generally parallel, but minor misalignments between them may occur in vehicle assembly or field service adjustments. Thus, a further pair of ball stud couplings 32 operatively connect the adjacent ends of links 22 and 26 with connecting arm 34. Another such ball stud coupling 32 operatively connects the remote end of link 26 with the arm 38 of shaft and housing assembly 28. Accordingly, the various couplings 32 being constructed of ball stud and socket type, relative rotation between the various connecting parts may occur in more than one plane during operation of the wiper mechanism as set forth. It is also preferred that the link members 22 and 26 be economically fabricated of stamped sheet metal having terminal end portions such as indicated in FIG. 2 featuring a single flat stock thickness presenting minimum space consumption in the areas of coupling.

In accordance with the objectives of the invention there is provided a ball stud and socket coupling or interconnection combination featuring for each coupling 32 a ball stud 40 having an enlarged spherical coupling portion 41 rotatably received within a socket type bushing member 42. As exemplified in the parts seen in FIG. 2, each coupling combination involves a flat surface of the terminal end of each link 22 or 26 which overlies a similar flat surface of a respective crank or connecting arm 18 or 34, etc. For the reasons mentioned, these surfaces do not necessarily hold the parallel relation shown during operation of the windshield wiper mechanism.

Figure 4:
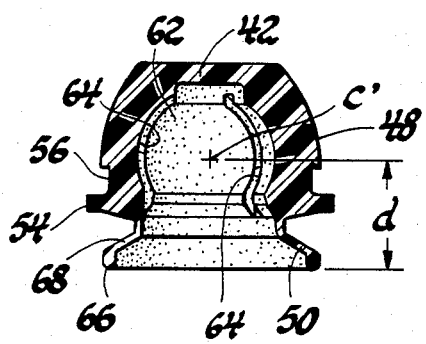
FIG. 4 is a sectional view taken generally along the planes indicated by lines 4—4 of FIG. 3.
Figure 5:
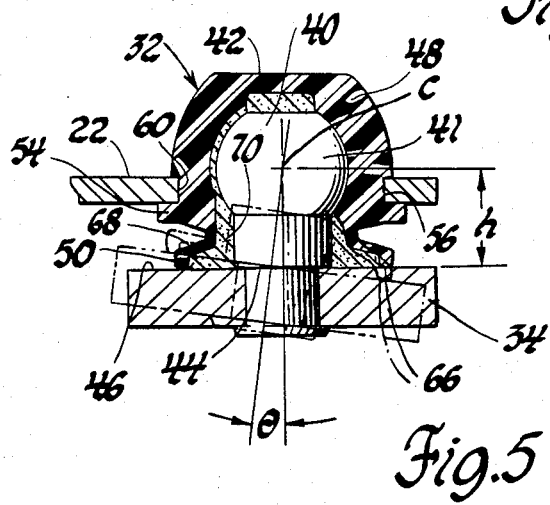
FIG. 5 is an enlarged sectional view taken from FIG. 2 generally along the plane indicated therein by lines 5—5 and showing the parts in different angular relations.

The description which follows is to be understood as applicable for all illustrated couplings 32. Referring to FIG. 5, ball stud 40 includes below its spherical coupling head 41 a stepped diameter shank presenting a shoulder 44 seated against the flat upper surface 46 of, in this case, the end of connecting arm 34. The ball stud is held on arm 34 by upsetting an exposed end and heading it over on the opposite surface. The spherical center of the ball stud head portion 41 indicated at "C" is, in accordance with the invention, designed to be located a predetermined distance or height "h" above the surface 46 of the end of connecting arm 34. Referring to FIG. 4, bushing 42 is fabricated in a single piece from a polymeric material suitable to precision molding and to the functional objectives to be set forth. Such bushing includes a coupling head portion 48 formed integrally with a depending sealing skirt portion indicated generally at 50. Coupling head 48 includes an inner spherical socket surface formed on a spherical center "C'" and, as formed in the mold, such center is located a predetermined distance or height "d" above the terminal end portion or lip of the skirt portion 50.

Figure 3:
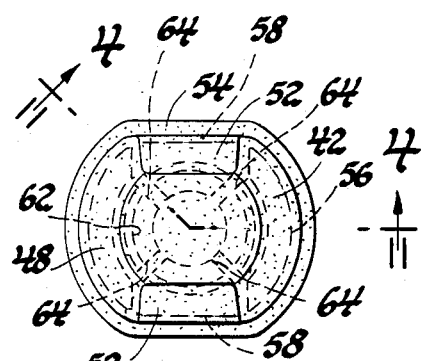
FIG. 3 is an enlarged plan view of the polymeric bushing of the transmission of this invention.

As seen best in FIG. 3, coupling head portion 48 of the bushing is of a generally circular profile in plan view but featuring flattened areas 52 on the exterior surface and a likewise locally flattened rib 54 around the entire periphery of the head. Above the rib 54 there is provided a continuous groove 56 having similar flattened opposing regions as at 58. The general result is a somewhat tapering or pyramidal upper contour to bushing 42 suitable to forceable insertion thereof, as will be described, within an aperture 60 formed in the end of the links 22. Such aperture is formed of a generally rectangular shape matching flats 58 to prevent relative rotation of the bushing within the link during wiper operation.

Referring to FIG. 4, the interior socket or spherical surface of the coupling head portion of the bushing is provided with a cavity 62 and further a series of shallow lubricant grooves 64 communicating therewith and leading to the mouth or interior bore of the skirt portion 50. Skirt portion 50 is comprised of a series of elements in a general shape which will implement the functional objectives of elastic yieldability during relative movement of the wiper transmission parts, as well as provision of a wide mouth annular seal maintained throughout such movement in firm contact at surface 46. The seal is accomplished by a lip 66 preferably fabricated as an element with some height and added thickness for self-rigidity and also a rounded contact undersurface. In the instant embodiment, the lip is connected with the head coupling portion of the bushing by a thin-walled single frustoconical fold element 68 flaring laterally of the bushing axis. Taken in combination with the material properties and wall thickness, this single conical element well serves the flexural or resilient function of the skirt while also maintaining lip 66 in firm contact with surface 46. Of course, variations may be made wherein added or different specific shapes of elements will function as described.

To provide compression strength or firmness as well as wear toughness in the coupling portion yet elastic yieldability in the skirt portion of this one-piece bushing, the material properties thereof are in accordance with the invention combined with a configuration of wall thickness of the bushing which varies through its portions. To meet the conflicting functional needs, a hard elastomer, i.e. hardness generally above 80 Shore A durometer reading, is utilized. The bushing is structured so that its coupling head portion has substantial thickness and such that the wall of the integral sealing skirt is only fractionally as thick. In one embodiment, the wall of coupling head portion 48 is in the order of 10 times the thickness of the wall of element 68, and the thickness of annular lip 66 about twice that of element 68. A preferred material is polyurethane. For the one embodiment, the hardness was about 65 Shore D indicator reading. In the one embodiment, it was compounded primarily with a polyether base to exhibit water and alcohol resistance suitable to the instant windshield wiper application. However, it was preferred to blend a polyester base in the compound to obtain oil resistance as well. Such urethane material also demonstrates resistance to the cuts that might occur during automated assembly of the bushing within steel parts. Further, it is resistant to creep under compressive loadings applied to the coupling head and sealing skirt portions under the various hostile operating conditions in the wiper mechanism. There follows a more detailed table of material property specifications applicable to the one embodiment, defined in terms of well known criteria established by the American Society For Testing and Materials.

dated in sealing skirt portion 50 by elastic flexure to a like degree in element 68, as indicated by the broken lines, from its solid line prestressed condition. The engagement of the sealing lip 66 on surface 46 is undisturbed during such flexure.

| ASTM DESIGNATION | ASTM D-2000 4BG640 A14, E34, $Z_1$, $Z_2$, $Z_3$, $Z_4$, $Z_5$, $Z_6$ | |
| --- | --- | --- |
| B | Test Temperature | 100° C. |
| G | Volume Swell, Max. percent | 10% |
| 6 | Hardness, Durometer Shore D | 65 ± 3 |
| 40 | Tensile Strength, Min. | 28.0 MPa |
| A14 | Heat Resistance ASTM D-573 70 hours @ 100° C. | |
| | Change in hardness, max., points | ±5 |
| | Change in tensile strength, max. percent | −5 |
| | Change in ultimate elongation, max. percent | −10 |
| E34 | Fluid Resistance, ASTM D-471, No. 3 Oil 70 hours @ 100° C. | |
| | Change in hardness, max. points | ±5 |
| | Change in tensile strength, max. percent | −5 |
| | Change in ultimate elongation, max. percent | −10 |
| | Change in volume, percent, max. | +10 |
| $Z_1$ | Pull Rate, | 2 inches per minute |
| $Z_2$ | Hardness, Shore D | 65 ± 3 |
| $Z_3$ | Tensile Strength (4000 Psi min.) | 28.0 MPa |
| $Z_4$ | 100% Modulus (3000 Psi) | 21.0 MPa |
| $Z_5$ | Volume Change ASTM #3 Oil | 10% max. |
| $Z_6$ | Compression Set ASTM D-395 Method B Max. percent after 70 hours @ 65° C. | 40 |

Accordingly, in the coupling head region, the bushing functions to positively and firmly connect the transmission parts with relatively insignificant relative displacement (lash) therebetween under load. The bushing coupling head will undergo extended service without compression set, undue wear, or deterioration. Further, in the utilization of the material indicated above, taken with the pyramidal bushing profile shown, assembly of parts is facilitated. Even with groove 56 preferably deep and sized to closely fit aperture 60, the head of the bushing may nevertheless be readily pressed into the link aperture and compress to an extent allowing the groove to snap into place. Furthermore, we have found that with this relatively limited compressibility in the thick walled coupling head, there may be a simultaneous insertion of the ball stud in the bushing socket during automated assembly of parts. We find also that the thick walled bushing head above-described provides a useful shock absorption quality in each coupling 32. The abrupt motion reversals that occur in the transmission linkage oscillations are transmitted somewhat elastically, thereby to smoothen operation and prolong service life.

In line with out objects, the thin walled skirt portion 50 serves as a lifetime seal. In the automated or other assembly of coupling 32, insertion of ball stud 40 to its seated condition within the bushing socket partakes of the predetermined difference between dimensions "h" and "d" such that as the lip 66 engages surface 46, the skirt portion 50 is prestressed elastically to the deformed condition shown in FIG. 5. There, the flexural element 68 of the skirt provides a restoring force or bias in the skirt portion bearing the lip 66 thereof firmly against surface 46 of the link. This elastic deflection or prestressing is chosen to meet the like amount of angular displacement that could occur between surface 46 and arm 34 in any of several planes of the coupling connection, and which amount is indicated by the angle $\theta$ in FIG. 5. Accordingly, during wiper operation, such known degree of universal motion is readily accommo- Each coupling 32 is preferably filled during assembly with a quantity of lubricant 70 throughout the various cavities of bushing 42 and the skirt portion 50 maintains this lubricant and prevents entry of contaminating elements throughout the service life of the coupling. The flared or single frusto-conical nature of element 68 resiliently readily accommodates the angular displacements encountered and also defines a large diameter lip element 66 and a large internal volume around the shank of the ball stud. The lubricant volume is thus large, as we prefer, but as indicated hereinabove a variety of other specific shapes in this integral sealing skirt may prove equally effective.

The embodiments of the invention in which an exclusive property or privilege is claimed are defined as follows:

1. In vehicle windshield oscillatory motion transmission apparatus of the type including first and second transmission members limitedly rotatable relative to each other in diverse planes and one of which has affixed thereto a ball stud received for such relative rotation in diverse planes within a polymeric socket bushing mounted within an aperture in the other of said members, the improvement which comprises mounting said ball stud over a flat surface of said one member with the spherical center of the ball head of said stud located a predetermined distance above said surface, said bushing being constructed of a hard elastomer and including a ball coupling portion received within said aperture of said other member and formed with a thick wall defining an inner ball socket, said bushing further including a depending resilient annular skirt portion of substantially thinner wall integral with said thick walled coupling portion and having a terminal annular end engaged with said surface of said first member, and a quantity of lubricant contained internally of said bushing, the dimension between the spherical center of the socket of said coupling portion and the terminal annular end of said skirt portion of said bushing when the latter portion is unstressed being predeterminedly greater than said predetermined distance of said ball head whereby upon installation of said ball stud within said bushing the skirt portion is prestressed under engagement of the lip thereof against said surface to an extent such that said lip is maintained resiliently thereagainst as a lubricant seal during said relative rotation of said transmission members in plural diverse planes.

2. In vehicle windshield wiper oscillatory motion transmission apparatus of the type including first and second transmission members limitedly rotatable relative to each other in diverse planes and one of which has a shanked ball stud thereon received for such relative rotation in diverse planes within a polymeric socket bushing mounted within an aperture in the other of said members, the improvement which comprises mounting the shank of said ball stud upon a flat surface of said one member with the spherical center of the enlarged ball head of said stud located a predetermined distance above said surface, said bushing being constructed of hard polyurethane elastomer and including a ball coupling portion received within said aperture of said other member and formed with a thick wall defining an inner ball socket, said bushing further including a depending resilient annular skirt portion of substantially thinner wall integral with said thick walled coupling portion and enclosing the shank of said stud, said skirt portion having at least one flexural element flared laterally of the shank of the stud and connected with a terminal annular lip spaced substantially radially from the shank and engaged with said surface of said first member, and a quantity of lubricant contained internally of said skirt portion around said shank and within said coupling portion, the dimension between the spherical center of the socket of said coupling portion and the terminal annular lip of said skirt portion of said bushing when the latter portion is unstressed being predeterminedly greater than said predetermined distance of said ball head whereby upon installation of said ball stud within said bushing said flexural element of said skirt portion is prestressed under engagement of the annular lip thereof against said surface to an extent such that said lip element is maintained resiliently thereagainst as a lubricant seal during said relative rotation of said transmission members in plural diverse planes.

* * * * *